M. MORRISON.
HYSTERESIS POWER TRANSMITTER AND BRAKE FOR PHONOGRAPH MOTOR MECHANISMS.
APPLICATION FILED SEPT. 5, 1916.
1,424,769.
Patented Aug. 8, 1922.
2 SHEETS—SHEET 1.
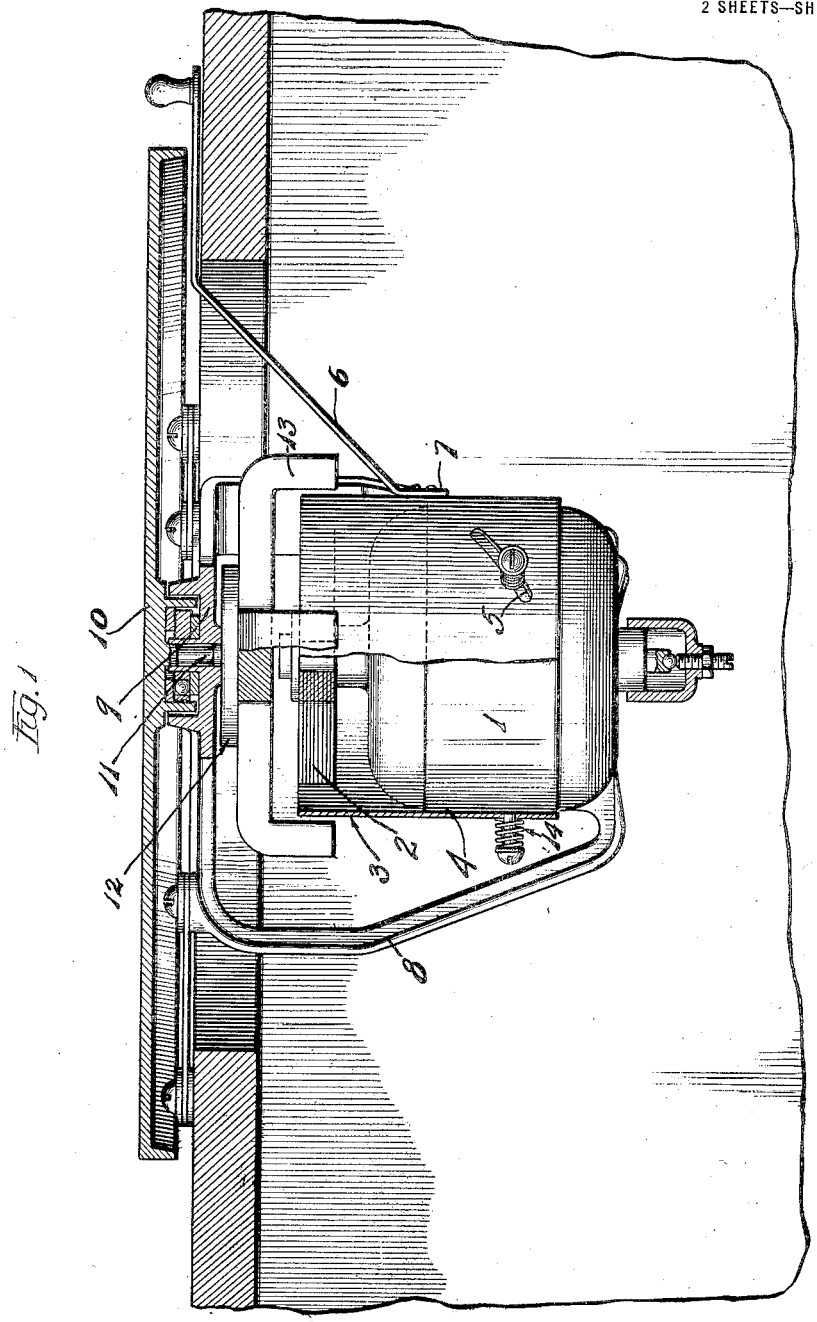

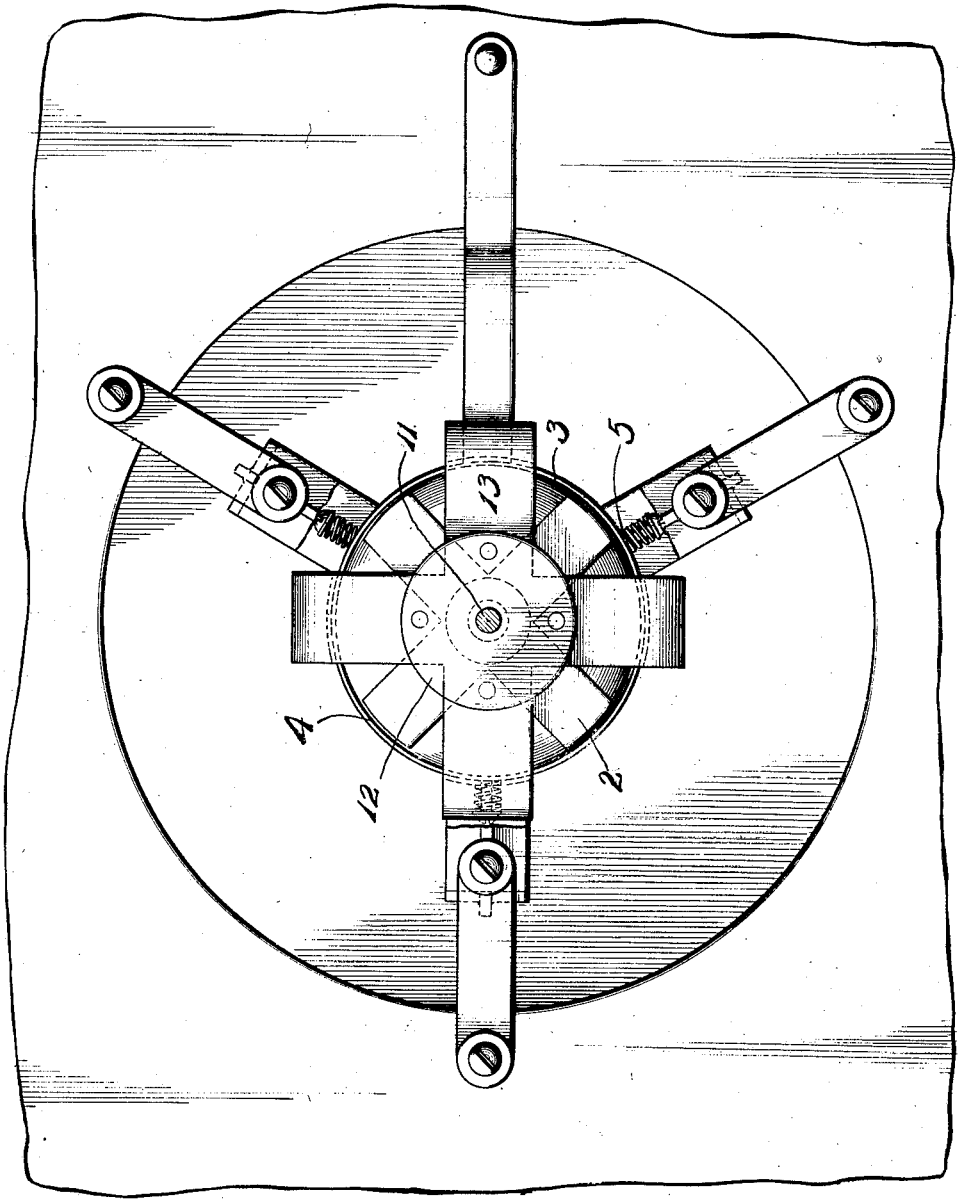

UNITED STATES PATENT OFFICE.

MONTFORD MORRISON, OF CHICAGO, ILLINOIS.

HYSTERESIS POWER TRANSMITTER AND BRAKE FOR PHONOGRAPH MOTOR MECHANISMS.

1,424,769. Specification of Letters Patent. Patented Aug. 8, 1922.

Application filed September 5, 1916. Serial No. 118,441.

*To all whom it may concern:*

Be it known that I, MONTFORD MORRISON, a citizen of the United States, residing at Chicago, county of Cook, State of Illinois, have invented new and useful Improvements in Hysteresis Power Transmitters and Brakes for Phonograph Motor Mechanisms, of which the following is a specification, such as will enable those skilled in the art to which it appertains to make and use same.

My present invention relates to all machines of any class requiring small amounts of power at absolutely constant, easily fixable speeds, and is, therefore, especially adapted to phonograph motor-mechanisms.

The object of my invention is to provide for such machines, a means of transmission between the motor and the driven rotor, such that will drive the rotor at constant speeds independent of the speed of the motor and thereby acting as a perfect governor and also to provide a means of easily fixing the speed of the rotor at any arbitrary value such as by the operation of a lever, and furthermore, to provide such construction that the transmission will not be subject to wear nor atmospheric conditions, all of which will be hereinafter set forth.

In the accompanying drawings, I have shown a form of my invention which serves well for illustration, although I have omitted any cushions between the motor and the rotor, I will in practice reserve the right to interpose them. These drawings embody the spirit of my invention as applied to phonographs and I reserve the right to modify the construction for different applications, in as far as the spirit of my invention goes.

Fig. 1 is a side elevation and partial section of my invention as applied to the operation of a phonograph and Fig. 2 is a plan view of same.

In Fig. 1, 1 is a motor used as a source of mechanical energy, 2 is a laminated armature which is fixed to the shaft of motor 1, and therefore, revolves with its rotating, power-delivering element. This armature is preferably of a material of high magnetic hysteretic loss and laminated for low eddy current loss, the utilization of which characteristics will be set forth hereinafter. Around this laminated armature 2 is a hollow cylinder, 3, which is preferably of a material of high electrical conductivity and is held in a position concentric with the laminated armature by reason of fitting a finished concentric surface on the frame of motor 1 at 4, Figs. 1 and 2. Hollow cylinder 3 has a multiple number of slots such as is shown at 5, which slots have the directions of threads of screws whose axes are identical with the axis of that of the hollow cylinder and which slots are provided with fitting pins or the like, fixed radially to the motor frame, which pins cause the hollow cylinder to progress in one direction or the other along its axis when it is rotated by means of lever 6 which is fixed to the hollow cylinder 3 at point 7. In this way hollow cylinder 3 may be made to shield all, any amount, or none of the faces of the armature. Springs 14 are supplied for friction against the hollow cylinder to prevent the cylinder from turning by torque caused by sources other than intentional turn by hand.

Motor 1 is provided with a multiple number of arms such as 8 Fig. 1, which serve as supports for the motor as well as for the bearing 9. Bearing 9 supports the turn table 10, which has a fixed shaft 11, which carries a fixed collar 12, onto which is mounted a multiple number of pole pieces 13, which may be permanent magnets or electro magnets and which encircle the armature 2, and the hollow cylinder 3 may be wholly, partly or not interposed between the two.

I will show that:

First, the speed of the field pieces 13, hence the turn table 10, is independent of the speed of armature 2 and, Second, the speed of the field pieces 13, hence the turn table 10, may be adjusted to a fixed value by means of hollow cylinder 3.

It is shown in Karafretoff's work on Experimental Engineering (2nd ed. vol. 1 p. 190) that hysteresis torque is independent of the speed of the machine. Ewing utilized this principle in his Magnetic Tester Journal Institute of Electrical Engineers, April 25, 1895; Magnetic Induction in Iron and Other Metals (3rd ed. revised p. 378) to produce a deflection of a pointer independent of the speed, but did not employ a construction to produce constant speed in a driven part independent of the speed of the driver and this latter comprises the spirit of my invention.

Referring to the figures, I will proceed with the theory of operation, and for simplicity, I will postpone the discussion on the function of the hollow cylinder 3, and will outline the theory as though it were not present.

When the rotating element of the motor 1 is set into motion, laminated armature 2 is revolved, an alternating magnetic field is set up in it due to passing under the field pieces 13, and since the laminations reduce the eddy currents to a negligible quantity, the torque revolving the field pieces obeys the following law (see first cited reference.)

$$\text{Torque} = KCVB^{1.6}$$

in which K and C are coefficients, the latter involving the grade of iron, V is the volume of iron and B is the maximum magnetic induction. This shows that with any one armature I get one and only one constant speed of the field pieces and connected load independent of the speed of the laminated armature. But I can set this load speed at high or low values by varying the values of the constituents of the above equation.

This definite constant speed referred to assumes a constant load which is the case with the turntable but by inserting at some definite position between the field pieces and the armature, the hollow cylinder 3, which is of high electrical conductivity, I can absorb a definite amount of power, more or less, at different positions and thereby braking the speed down to the desired value. This, of course, is the common eddy current brake except that the magnetic circuit intensity pulsates.

It will be appreciated that this power transmitter is in effect a brake for the motor employed and I reserve the right to use it as such.

In some cases I may use a constant magnetic intensity brake in conjunction with the power transmitter or I may use as hysteresis brake and adjust the braking by means of varying an air gap, and thereby varying the magnetic intensity in a laminated piece which gives different hysteretic losses and these may be utilized as power absorbers and hence brakes.

I have already acknowledged prior utilization of these principles, but which do not cover my invention and, therefore, I claim:—

1. In an apparatus of the class described, a driving shaft carrying an armature of hysteretic material, a driven shaft carrying a field in juxtaposition to the field piece in such manner that the magnetic flux of the field establishes a connection therebetween, a normal load connected to the driven shaft of such magnitude as to cause slip between the armature and field, causing hysteresis torque between the armature and field, and as to cause the driven shaft to be driven at a constant speed independent of speed fluctuations in the movement of the field piece, means interposed between the field piece and armature adapted to absorb power, and means adapted to vary the relative positions of the armature, the field piece and the means interposed therebetween.

2. In an apparatus of the class described, a driving shaft carrying an armature of hysteretic material, a driven shaft carrying a field in juxtaposition to the armature in such manner that the magnetic flux of the field establishes a connection therebetween, a normal load connected to the driven shaft of such magnitude as to cause slip between the armature and field, causing hysteresis torque between the armature and field, and as to cause the driven shaft to be driven at a constant speed independent of speed fluctuations in the movement of the field piece, and a cylinder of material of high electrical conductivity mounted so as to be adapted to be adjustably interposed between the field piece and the armature to vary the connective force therebetween.

MONTFORD MORRISON.

Witnesses:
W. BLOMMERT,
S. MULREE.